May 28, 1935.  F. C. WAPPLER  2,002,595
TELESCOPIC INSTRUMENT
Filed Dec. 6, 1933
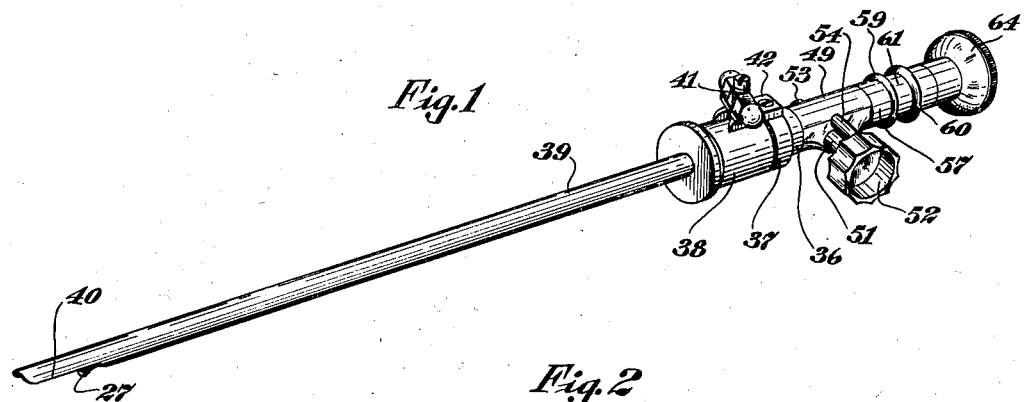
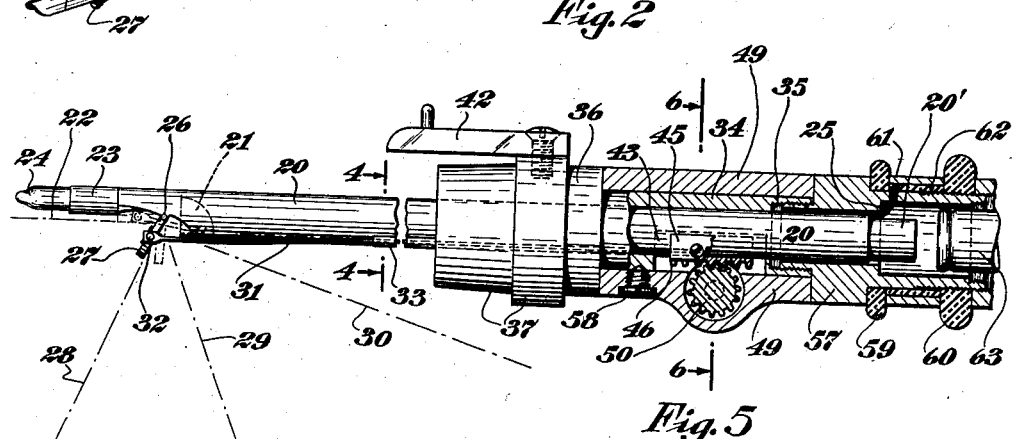
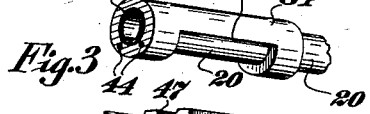
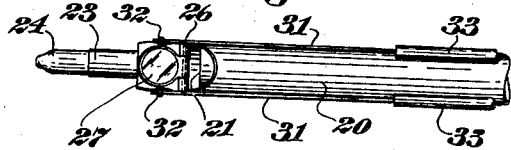
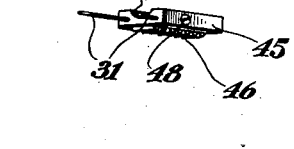
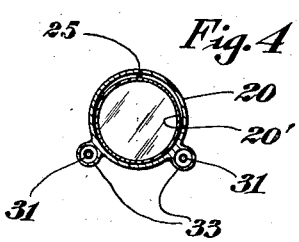
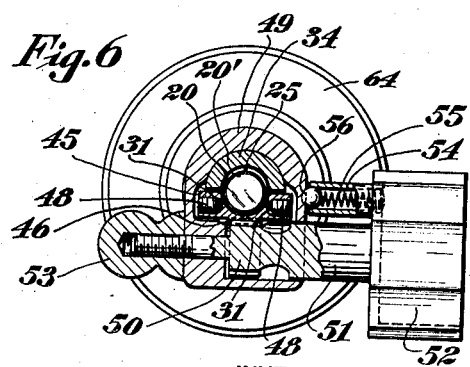
INVENTOR
Frederick Charles Wappler,
BY
Frederick Breitenfeld
ATTORNEY Patented May 28, 1935

2,002,595

UNITED STATES PATENT OFFICE 2,002,595

TELESCOPIC INSTRUMENT

Frederick Charles Wappler, New York, N. Y.

Application December 6, 1933, Serial No. 701,096

6 Claims. (Cl. 128—7)

My present invention relates generally to surgical instruments, and has particular reference to telescopic instruments.

One general object of my invention is to provide an improved telescope, adapted to be used either alone or in association with operative instruments, for the purpose of viewing, under illumination, interior portions of the human body. More particularly, I aim to provide an improved device which will permit visibility of a greatly increased field, and, more especially, a field which includes within its scope a rearward range of vision lying alongside of the telescope itself.

From one aspect, it is an object of the present invention to improve upon the type of instrument which embodies the advantageous characteristics of the telescope illustrated in United States Letters Patent No. 1,680,491, issued August 14, 1928, and to provide for a wider and more adjustable range of vision.

The salient characteristic of the foregoing patented type of telescope lies in the fact that a single telescopic tube is provided at its forward end with an attenuated, fixed lamp extension which lies within the cylinder defined by the peripheral surface of the telescopic tube, and an objective lens of particular characteristics being mounted in the tube behind said extension. The field of vision commanded by such an instrument is forwardly oblique, the inner boundary of the field skirting the extension. In accordance with my present invention, a telescope of this kind is modified and improved by an adjustable arrangement which permits a lateral and even a rearward illuminated field of vision to be brought within the range of the objective.

It is a feature of the present invention to provide a telescopic tube commanding a forwardly oblique field of vision, and carrying at its forward end, immediately in advance of the objective, a pivotable or deflectable mirror which is effective to reflect into the objective a substantially rearward field of vision. I am aware of prior uses of mirrors, generally, for controlling or modifying the field of vision of a telescope, but it is a characterizing feature of my invention to provide a mirror which is pivoted directly to the forward end of the telescopic tube, and which normally lies in its entirety in a longitudinal plane along the inner boundary of the field of vision.

From another aspect, my invention relates to an improved means for controlling the pivotal movements of the mirror in a device of the foregoing type; and from a broader point of view, my invention relates, generally, to an improved arrangement for controlling the pivoting or deflecting of any type of pivotable or movable member arranged at the forward end of a telescopic tube. A particular feature of my invention lies in an arrangement which provides for the complete enclosure of the mechanism which controls the movements of the pivotable or movable member, whereby the resultant assembly is of enhanced workmanlike character, of great compactness, and readily sterilizable without danger of corrosion or similar impairment of the delicate parts of the control mechanism.

I achieve the foregoing objects and advantages, and such other objects and advantages as may hereinafter appear or be pointed out, in the manner illustratively exemplified in the accompanying drawing, wherein—

Figure 1 is a perspective view of an instrument embodying the features of my present invention;

Figure 2 is a side view of the instrument of Figure 1, shown on an enlarged scale and partly in cross-section;

Figure 3 is an exploded view of certain portions of the mechanism shown at the right of Figure 2;

Figure 4 is a cross-sectional view taken substantially along the line 4—4 of Figure 2;

Figure 5 is a bottom view of the forward portion of the instrument;

Figure 6 is a cross-sectional view taken substantially along the line 6—6 of Figure 2.

The telescopic tube 20 is constructed substantially in accordance with the teachings of the aforementioned Patent No. 1,680,491, containing a lens system of suitable character which includes an eccentric objective lens 21 at the forward end of the tube. This objective commands a forwardly oblique field of vision whose inner boundary is approximately represented by the dot-and-dash line 22 of Figure 2. The field of vision is substantially conical, and the apex of the cone is disposed toward the thicker side of the lens 21, and not toward the longitudinal central axis of the tube 20 as would ordinarily be the case. The inner boundary 22 is substantially parallel to the axis of the tube 20 and skirts the attenuated, lamp-carrying extension 23 which is mounted at the forward end of the tube 20 and which lies in its entirety within the cylinder defined by the peripheral surface of the tube 20. An electric lamp bulb 24 is carried at the tip of the extension 23, and the electrical connection to the bulb is established by means of a conductor 25 which extends longitudinally along the tube 20. More particularly, the tube 20 is formed of an outer shell and an inner shell, seen most clearly in Figure 6, the inner shell being designated by the reference numeral 20', and the conducting wire 25 is snugly disposed between these two nested portions of the telescopic tube.

Pivoted to the rear end of the extension 23, as at 26, is the mirror 27 which normally lies flat against the adjacent face of the extension 23, being thereby disposed normally in a substantially longitudinal plane lying along the inner boundary 22 of the normal field of vision. The mirror thus lies in its entirety, under normal conditions, within the cylinder defined by the peripheral surface of the tube 20. When thus disposed, the field of vision of the telescope is obliquely forward, the mirror intruding only by a negligible amount into the inner boundary of this field.

The mirror is adapted to be pivoted around the axis 26 by varying degrees, as indicated in Figure 2. When pivoted into substantially the middle position of Figure 2, it reflects into the objective a field of vision which is approximately defined by the dot-and-dash lines 28 and 29. When pivoted into the extreme position of Figure 2, the mirror reflects into the objective 21 a substantially rearward field of vision approximately defined by the boundaries 29 and 30. It is to be noted that the lamp 24 remains fixed during these movements of the mirror. This permits the instrument to be inserted into extremely narrow or constricted passages and enables the operator to obtain an illuminated rearward field of vision within even the most constricted regions.

The pivoting of the mirror is accomplished by one or more control rods 31 which are articulated at their forward ends to the opposite sides of the mirror, as at 32, and which extend rearwardly along the tube 20, preferably through the laterally disposed guide tubes 33 lying closely adjacent to the tube 20. A slight retractive movement of the rod or rods 31 draws the mirror into a position in front of the objective 21, while an advancement of the rod or rods 31 returns the mirror to its normal position.

In accordance with my present invention, the rear portion of the tube 20 carries a snugly fitting sleeve 34 having its bore slightly enlarged at the rear end and internally threaded as at 35. Forwardly of this sleeve, and integral therewith, if desired, is the collar or flange 36; and associated with the latter is the plug portion 37 which is adapted to fit snugly and in liquid-tight manner into the rearwardly disposed sleeve 38 of an outer endoscopic sheath or tube 39. The tube 39 may or may not be used, depending upon circumstances, and is preferably provided with the lateral fenestra 40 at its forward end. The sleeve 38 usually carries the connecting mechanism 41 adapted to engage and cooperate with the forwardly projecting fork 42 carried by the plug portion 37. The elements 41 and 42 are the usual ones which serve to hold the telescope and its associated parts in firm but releasable association with the endoscopic sheath 39.

In accordance with my present invention, the sleeve 34 is provided with the lateral recess 43. Forwardly of this recess, and communicating with the forward portion thereof, the sleeve 34 is provided with the longitudinal bore or bores 44 adapted to slidably accommodate the rear portions of the control rods 31.

Slidably mounted within the recess 43 is a rack element 45 whose outer surface is provided with the rack teeth 46 and whose inner end is concaved, as at 47, to enable it to fit snugly yet slidably against that portion of the tube 20 which is exposed in the recess 43. The control rods 31 are connected at their rear ends to the rack element 45, this being preferably accomplished by means of the set screws 48 which extend laterally into the element 45 and bear against the rear ends of the rods 31, as shown most clearly in Figures 3 and 6.

The longitudinal reciprocation of the rack element 45 within the recess 43 is obviously limited by the front and rear walls of this recess, and this reciprocation is not very extensive but is just sufficient to advance or retract the rods 31 by the degree required to pivot the mirror between its two extreme positions.

My present invention provides for the complete enclosure of the sleeve 34 by means of the tubular housing 49, the exterior diameter of this housing being substantially equal to the diameter of the collar 36, whereby the forward end of this housing is adapted to abut against the collar 36. The housing carries on its interior a pinion 50 which meshes with the teeth 46 of the rack and which is mounted upon a transverse spindle 51 carrying an enlarged handwheel 52 on its end. The spindle 51 is preferably held in position by means of a nut 53 engaged over the threaded opposite end of the spindle 51, as shown in Figure 6.

Preferably, but not necessarily, the wheel 52 carries a tube 54 within which a spring 55 presses a ball 56 against the contiguous surface of the housing 49. This surface may be provided with a slight depression so that the ball serves as a yieldable detent to indicate to the operator, by feel, whenever the pinion is in a predetermined position, e. g., in the position which causes the mirror to command a purely lateral field of vision.

A retaining collar 57 is adapted to be threaded into association with the rear end of the sleeve 34, this collar having an exterior diameter substantially equal to that of the housing 49. When the housing is in position, it is thus held in proper position by means of the collars 36 and 57, these collars sandwiching the housing between them and thereby completely enclosing the sleeve 34, the rack element 45, the pinion 50, the rear ends of the control rods 31, and all the other elements of the delicate mechanism which controls the pivoting of the mirror 27. If desired, a set screw 58 may be used to help lock the housing 49 in its proper relationship.

Mounted on the rear portion of the retaining collar 57 are the insulating colars 59 and 60, and between them is the conductive band 61 with which the rear end of the conductive wire 25 is connected. The band 61 is insulated from the collar 57 by means of the insulating lining 62. The band 61 is the usual one to which an external electrical connection may be made for the purpose of energizing the lamp 24.

Screwed into the rear portion of the collar 57 is the rear portion 63 of the optical system of the telescope, which includes the usual eyepiece 64.

It will be observed that the complete instrument, in so far as the telescopic tube assembly is concerned, embodies no exposed parts or mechanisms. The entire telescope, and with it the mirror and all the control mechanism, may thus be sterilized without any danger of subjecting the optical system of the telescope or the rack-and-pinion mechanism to the water or steam. It is further to be noted that the rack-and-pinion assembly is completely enclosed and is mounted in a uniquely compact manner in association with the telescopic tube. When it is borne in mind that the usual rack-and-pinion mechanism requires a lateral projection of substantial size and that the rear ends of the control rods are usually exposed, the advantageous characteristics of the present construction and mode of assembly will be more fully understood.

Those skilled in the art will readily appreciate that the mechanism at the rear portion of the instrument need not necessarily be used in connection with a pivotable mirror of the kind shown, and that this mechanism is equally applicable to the control of the movements of any other type of member in the forward end of the telescope, such as a catheter deflector or the like.

I am aware of the fact that rack-and-pinion arrangements for controlling the movements of parts of a surgical instrument are not broadly new, and I do not mean to claim this mechanical association of parts, per se. I believe, however, that the present mode of assembling a control mechanism in substantially concentric relation to a telescopic tube and in a completely enclosed manner is new in the art.

In general, it will be obvious that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In an instrument of the character described, the combination with a telescopic tube, a movable member at the forward end thereof, and a control rod extending rearwardly from said member; of a recessed sleeve around the rear end of the telescopic tube, a rack slidably mounted in said recess and connected to the rear end of said rod, and a tubular housing completely enclosing said sleeve and rack and carrying within it a pinion which meshes with said rack.

2. In an instrument of the character described, the combination with a telescopic tube, a movable member at the forward end thereof, and a control rod extending rearwardly from said member; of a recessed sleeve around the rear end of the telescopic tube, a rack slidably mounted in said recess and connected to the rear end of said rod, a tubular housing applicable over the rear of the sleeve to enclose the latter and the rack, said housing carrying within it a pinion which meshes with said rack, and a retaining collar removably engaging the rear end of said sleeve and abutting against the rear end of said housing to maintain the latter in position.

3. In an instrument of the character described, the combination with a telescopic tube, a movable member at the forward end thereof, and a control rod extending rearwardly from said member; of a recessed sleeve around the rear end of the telescopic tube, a rack slidably mounted in said recess and connected to the rear end of said rod, a tubular housing completely enclosing said sleeve and rack and carrying within it a pinion which meshes with said rack, and means abutting against the housing at the front and rear thereof to hold the housing in position.

4. In an instrument of the character described, the combination with a telescopic tube, a movable member at the forward end thereof, and a control rod extending rearwardly from said member; of a recessed sleeve around the rear end of the telescopic tube, a rack slidably mounted in said recess and connected to the rear end of said rod, a tubular housing completely enclosing said sleeve and rack and carrying within it a pinion which meshes with said rack, and means abutting against the housing at the front and rear thereof to hold the housing in position, said means comprising a collar in front of said sleeve, and a retaining collar removably engaging the rear end of said sleeve.

5. In an instrument of the character described, the combination with a telescopic tube, a movable member at the forward end thereof, and a control rod extending rearwardly from said member; of a sleeve around the rear end of the telescopic tube, said sleeve having a lateral recess and a longitudinal bore extending forwardly from said recess, said bore slidably accommodating said control rod, a rack slidably mounted in said recess and connected to the rear end of said rod, and a tubular housing completely enclosing said sleeve and rack and carrying within it a pinion which meshes with said rack.

6. In an instrument of the character described, a telescopic tube having an attenuated fixed lamp extension on the forward end thereof, said extension lying within the cylinder defined by the peripheral surface of said tube, an objective behind said extension and commanding a forwardly oblique field of vision which skirts said extension, a mirror pivoted to the rear portion of said extension and normally disposed in a longitudinal plane along the inner boundary of said field, and means engaging the mirror at the side thereof for pivoting it by varying degrees into the field of vision, thereby shifting the effective range of vision laterally and rearwardly.

FREDERICK CHARLES WAPPLER.